UNITED STATES PATENT OFFICE.

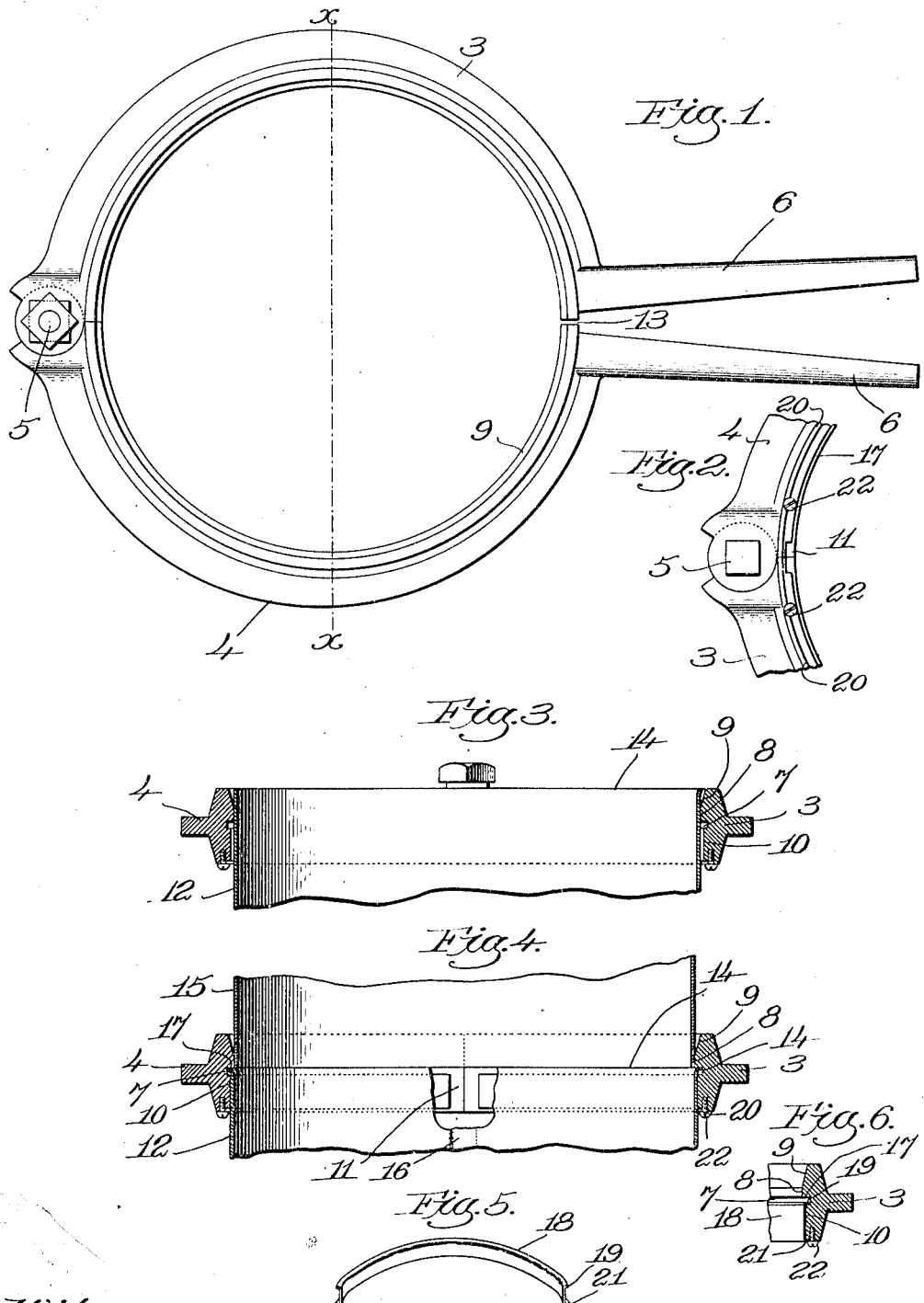

ANSON L. KEYES, OF FARIBAULT, MINNESOTA.

TOOL FOR COUPLING PIPES.

1,035,448.  Specification of Letters Patent.  Patented Aug. 13, 1912.

Application filed April 26, 1912. Serial No. 693,349.

*To all whom it may concern:*

Be it known that I, ANSON L. KEYES, a citizen of the United States, residing at Faribault, county of Rice, State of Minnesota, have invented an Improvement in Tools for Coupling Pipes, of which the following description, in connection with the accompanying drawing, is a specification, like characters on the drawing representing like parts.

This invention has for its object to provide a novel tool for coupling sections of sheet metal pipe.

Sections of sheet metal pipe are coupled together by inserting one end of one section into the end of the next section and where the two sections are of the same diameter it is necessary either to expand slightly the end of one section or contract or crimp the end of the other section in order to permit the two sections to be coupled together. My tool is designed for use in thus coupling sections of sheet metal pipe, and by means of this the end of one pipe can be expanded or flared slightly, and then the two pipe sections can be held in proper relation to each other while one section is inserted into the expanded end of the other section.

In the drawings wherein I have illustrated a selected embodiment of my invention which discloses the principle thereof, Figure 1 is a plan view of a tool embodying my invention; Fig. 2 is an underside plan view of a portion of the tool; Figs. 3 and 4 are sectional views on the line *x—x*, Fig. 1, showing different steps in the operation of coupling two pipe sections together; Fig. 5 is a perspective view of a filling ring to be used for pipe made of certain gage sheet metal; Fig. 6 is an enlarged sectional view through one side of the device showing the filling ring in place.

My tool is formed with a cylindrical body made in two sections 3 and 4 hinged together at 5 and adapted to embrace the pipe ends, each section being provided with a handle 6 by which the sections may be opened or closed. Each section is formed with an interior annular groove 7 to receive the flared end of one pipe section while the two sections are being coupled together, as will be presently described. The portion of the device above the groove 7 is formed with the cylindrical pipe-shaping surface 8 which merges into the outwardly-tapering surface 9. Below the groove 7 the device is formed with a cylindrical interior pipe-holding surface 10 which has a slightly larger diameter than the cylindrical surface 8. In fact, I prefer to make the cylindrical surface 10 on a radius which is greater than that of the surface 8 by about the thickness of the sheet metal pipe. The portion of the device below the groove 7 is formed with an interior notch 11 at the hinge thereof, as seen in Fig. 2.

In using the device it is placed about the end of a sheet metal section 12 so that the pipe extends through the cylindrical portion 8 and so that the upper edge of the pipe comes about flush with the top of the tube, as shown in Fig. 3. In placing the tool about the end of the pipe I prefer to so place it on the pipe that the seam of the pipe will come at the point 13 where the members 4 and 3 meet. After the device is placed about the pipe the handles 6 are pressed lightly together, so as to cause the tool to grip the pipe firmly, and then the end 14 of the pipe is flanged outwardly against the surface 9 by any suitable means. If the pipe is a thin pipe this can be readily done by taking some implement, such as a small piece of steel, scratch awl, hammer handle, etc., and passing it around the interior of the pipe several times under pressure, as shown in Fig. 3. The tapered surface 9 serves to limit the flanging operation and to give the flanged end of the pipe a proper shape. After the end 14 of the pipe section has been flanged the handles 6 of the tool are opened to relieve the gripping pressure of the tool on the pipe and the device is then lifted upwardly until the flanged end 14 of the pipe comes opposite the groove 7 when the handles are closed together again so as to cause the tool to grip the pipe again, as shown in Fig. 4. At this time the pipe 12 is turned in the tool so that the seam 16 thereof will occupy the notch 11. While the flanged pipe section 12 is thus held in the tool, the end of the other pipe section 15 which is to be coupled to the pipe section 12 is inserted downwardly through the flared portion 9 and cylindrical portion 8 of the tool and into the flared end of the pipe 12. During this operation the flared end 14 of the pipe section 12 stands underneath the shoulder or ledge 17 which is formed by one wall of the groove 7, and said ledge entirely protects the end 14 so that the pipe section 15 can be readily telescoped into the pipe section 12. The bared portion 9 guides the pipe end 15 into the cylindrical part 8 and the cylindrical part 8 holds the pipe 15 properly centered so that it can be forced into the pipe 12. It will be understood, of course, that if the pipe 15 cannot be readily inserted into the pipe 12 by hand the operator will drive the pipe section 15 downwardly by tapping on the upper end thereof with a hammer. When this is done a block of wood will preferably be placed on the upper end of the pipe section 15 to prevent the latter from being battered. Since the portion 10 of the tool is of slightly larger diameter than the portion 8 the flared end of the pipe section 12 is allowed to expand slightly if necessary while the pipe section 15 is being inserted.

In order that my device may work accurately with the same size of pipe, regardless of the thickness of the sheet metal of which the pipe is made, I have provided filling members 18 which can be placed on the portion 10 of the tool to vary the diameter thereof according to the thickness of the sheet metal from which the pipe is made. For coupling pipe made of thicker sheet metal the device is used without the filling member 18, but where the sheet metal of which the pipe is made is comparatively thin, a filling ring of the proper thickness will be employed. Each filling member is semicircular and has a general channel shape, as shown in Fig. 5, and when they are in place one flange 19 of each member sets into the groove 7, and the other flange 21 overlies the underside of the tool, as shown clearly in Fig. 6. The tool is preferably provided with the lip 20 against which the flange 21 bears, said lip serving to protect the flange. The filling members 18 may be held in place in any suitable way. As herein shown, I have provided screws 22 which underlie the flanges 21 of the filling members and hold them in place.

If desired I may employ some form of hook to hold the handles 6 together when the tool is placed in the position shown in Fig. 4, so that the person operating the device may have both hands free to manipulate the pipe 15.

While I have illustrated one embodiment of my invention, I do not wish to be limited to the constructional features shown except as required by the scope of the appended claims.

Under some circumstances it may be desirable to use filling rings, such as shown at 18, on the pipe-shaping portion 8 of the device, and it is within my invention to use filling rings either on said pipe-shaping portion 8 or on the pipe-clamping portion 10 as desired.

Having fully described my invention, what I claim as new and desire to secure by Letters Patent is:—

1. A device for coupling pipes comprising a circular member having an annular groove on its inner face, said member being formed on one side of the groove with a cylindrical pipe-shaping portion which merges into an outwardly-flaring portion, said member being formed on the other side of the groove with a cylindrical portion of slightly greater diameter than the pipe-shaping portion.

2. A device for coupling pipes comprising a circular member having an annular groove on its inner face, said member being formed on one side of the groove with a cylindrical pipe-shaping portion which merges into an outwardly-flaring portion, said member being formed on the other side of the groove with a cylindrical portion of slightly greater diameter than the pipe-shaping portion, and an annular filling member adapted to overlie said latter cylindrical portion to vary the diameter thereof.

3. A device for coupling pipes comprising a circular member made in two sections hinged together and each provided with a handle, each section having on its inner face an annular groove and being formed on one side of the groove with a cylindrical pipe-shaping face which merges into an outwardly-flaring portion, each member being formed on the other side of said groove with a cylindrical surface slightly larger in diameter than the pipe-shaping surface.

In testimony whereof I have signed my name to this specification, in the presence of two subscribing witnesses.

ANSON L. KEYES.

Witnesses:
ANDREW A. MURPHY,
ALICE K. FINK.

It is hereby certified that in Letters Patent No. 1,035,448, granted August 13, 1912, upon the application of Anson L. Keyes, of Faribault, Minnesota, for an improvement in "Tools for Coupling Pipes," an error appears in the printed specification requiring correction as follows: Page 2, line 1, for the word "bared" read *flared;* and that the said Letters Patent should be read with this correction therein that the same may conform to the record of the case in the Patent Office.

Signed and sealed this 24th day of September, A. D., 1912.

[SEAL.]

C. C. BILLINGS,

*Acting Commissioner of Patents.*